Dec. 26, 1939.  G. PIELSTICK  2,184,504
DAMPING DEVICE
Filed May 10, 1937
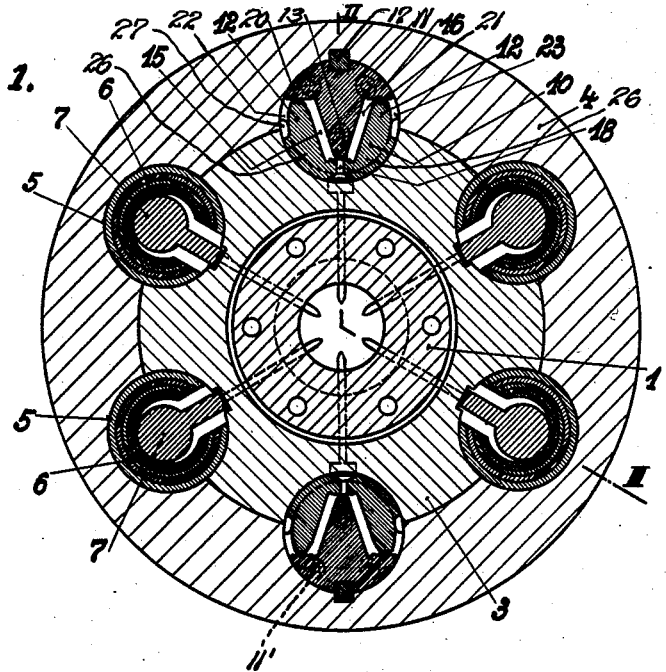
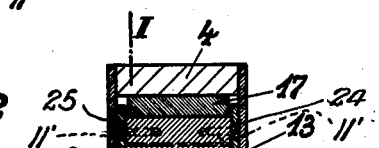
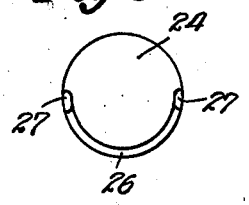
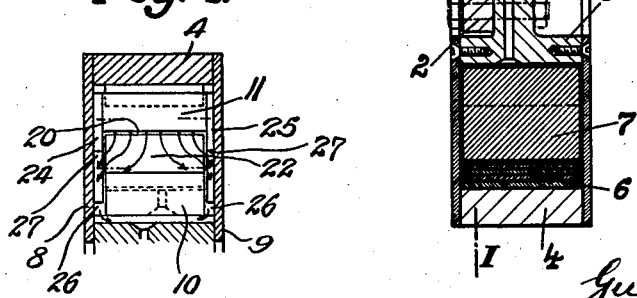
Inventor:
Gustav Pielstick Patented Dec. 26, 1939

2,184,504

UNITED STATES PATENT OFFICE 2,184,504

DAMPING DEVICE

Gustav Pielstick, Augsburg, Germany, assignor to Maschinenfabrik Augsburg-Nurnberg A. G., Augsburg, Germany, a corporation of Germany Application May 10, 1937, Serial No. 141,657
In Germany May 11, 1936

5 Claims. (Cl. 74—574)

My invention is concerned with devices for damping the vibrations of rotating shafts. Among other devices of this kind there are in use dampers in which a fly-wheel mass is connected with the shaft to be damped by means of interposed resilient elements. However, since in such damping devices the degree of damping depends on the particular combination of said resilient elements and the mechanical friction involved thereby, the damping effect in many cases is not sufficiently great to satisfy the great requirements demanded in the case of modern high-speed combustion engines. Even when damping devices are used, in which the said resilient connecting elements between the shaft and the fly-wheel mass are in the shape of spring-sleeves such as shown and described in my Patent 2,066,224 and which have proved quite satisfactory and whereby a damping effect of about 70% is obtained, it is in some instances necessary to still further increase the damping effect.

The object of the present invention is to accomplish this increase of the damping effect in damping devices of the kind above referred to by the provision, in addition to the said resilient connecting elements, of confined spaces or compartments filled with a liquid and from which this liquid, by the relative movement between the fly-wheel mass and the shaft, is displaced through narrow throttling passages or ducts. Because of the energy of motion destroyed on account of the throttling of the damping liquid a great damping effect is thus obtained.

In order to make my invention better understood, I refer to the annexed drawing, in which I have shown the invention applied to a damping device, in which between the fly-wheel mass and the rotating shaft there are interposed connecting elements comprising spring sleeves and in which Fig. 1 is a radial section taken along line I—I in Fig. 2, while Fig. 2 is an axial section taken along line II—II in Fig. 1.

Fig. 3 is a side elevation of one of the side disks used in connection with this invention. Fig. 4 is a fragmentary section through one of the chambers and showing the parts therein in elevation.

In the drawing, the rotating shaft is indicated at 1, while at 3 is shown a disk-shaped hub connected with shaft 1 by bolts 2. The hub 3 is encircled by a concentric annular fly-wheel mass 4. At 5 in Fig. 1 are shown cylindrical bores the centers of which are preferably located at or near the joint between the hub 3 and the fly-wheel mass 4. In these bores 5 are provided nested spring-sleeves shown at 6 and mounted around an inner fixed core 7, such as disclosed in my Patent 2,066,224. In order to prevent any lateral movement of the fly-wheel mass 4, the said spring-sleeves 6 and their core 7, side-plates shown at 8 and 9 in Fig. 2 are secured to the hub 3.

As shown in Fig. 1, there are six cylindrical bores 5 only four of which contain the nested spring sleeves 6 which act as damping elements as fully described and set forth in my Patent 2,066,224. In the two other cylindrical bores, disposed opposite to each other, there I provide additional damping elements which I will now describe. These latter damping elements each comprise an inner part 10 and an outer part 11 as referred to the rotating shaft 1. The inner part 10 which mainly rests in the hub 3 has two V-shaped walls 12 forming a hollow space into which extends a wedge-shaped projection 13 provided on the outer part 11. The wedge-shaped projection 13 is spaced from the inclined walls 12 so as to form therewith narrow chambers 15 and 16. As shown in Fig. 1, the outer part 11 is secured to the fly-wheel mass 4 by means of a key designated 17.

At the bottom of the hollow space formed by the inclined walls 12 there terminates a bore or port 18, through which a liquid, e. g., oil under pressure, may be supplied. Opposite the mouth of said bore 18 is the flattened edge of the wedge-shaped projection 13 being so disposed relative thereto, that in the center position of the projection 13, the mouth of the bore, except for a narrow throttling opening is nearly closed. In a similar way, the flattened upper ends of the V-shaped walls 12 are only slightly spaced from the corresponding flat portions of the outer part 11 leaving but narrow throttling passages 20 and 21, which form the only communication between the chambers 15 and 16 and the ducts 22 and 23 for the return flow of the oil.

The ducts 22 and 23 extend from side to side of part 10 and communicate with the recesses 27 formed in the disks 24 and 25 through the passages 26. With this arrangement, oil flow from the damping chambers will take place as shown by the arrows in Fig. 4, oil passing out from these chambers through the passages 20 and 21, passages 22 and 23, recesses 27 and passage 26 to the port 18 or to a passage 18' formed in the member 1. The disks 24 and 25 are secured to the member 11 by screws 11'.

From the foregoing description, the operation of these additional damping elements will be readily understood. If, for instance, because of the rotating oscillations of the shaft 1, the fly-wheel mass 4 moves relative to the hub 3, the wedge-shaped projection 13 of the outer part 11 of the damping element moves toward the corresponding wall 12 of the inner part 10 and thereby forces the liquid contained say in the chamber 15 out through the narrow throttling passage 20 into the return duct 22. As will be quite clear, due to the resulting throttling action, a large portion of the energy of motion is destroyed and thus the relative movement between the fly-wheel mass 4 and the hub 3 will be damped. As the projection 13 of the outer part 11 of the damping element during said movement of the fly-wheel mass 4 relative to hub 3 moves sideways, its flattened edge is somewhat displaced relative to the mouth of the port 18 thereby partly exposing the same, so that a greater amount of oil under pressure can flow into the chamber 16, which by the said sidewise movement of the projection 13 had been enlarged. If now a relative movement in the opposite direction takes place, the oil contained in the enlarged chamber 16 is displaced through the narrow throttling passage 21 into the return duct 23, while chamber 15 is again filled with oil. This sequence of alternate operations continues as long as any relative movement takes place. I may state here that the oil used in this damping element is always under sufficient pressure to insure the continual filling of the two chambers 15 and 16 of the damping element. As I have already stated, the displaced oil is forced into the return ducts 22 and 23 and through these finds its way back to the supply port 18. It will be seen that by a suitable dimensioning of the chambers 15 and 16 of the damping element and the throttling passages such a high damping effect may be obtained that the vibrations or oscillations of the rotating shaft can never become dangerous.

Obviously, the new damping elements need not be necessarily associated with damping devices comprising spring-sleeves as shown in the drawing, but can be used everywhere where in addition to existing resilient connecting elements between the fly-wheel mass and the rotating shaft a further damping device is desired. Therefore, I do not intend to be limited to the embodiment of the present invention as shown.

I claim:

1. In combination with a rotating shaft and a fly-wheel mass surrounding the same bores being provided between them, nested spring-sleeves disposed in some of said bores for damping the vibrations of said shaft, and additional damping elements contained in other bores and each comprising two relatively movable members forming between them compartments filled with a liquid and having throttling passages leading therefrom through which upon relative movements between said fly-wheel and said shaft the liquid in said compartments is displaced.

2. The combination as specified in claim 1, in which one of the members of said damping element is carried by said shaft, while the other member is secured to said fly-wheel mass.

3. In combination with a rotating shaft, a hub carried thereby, a fly-wheel and resilient damping elements disposed in complementary bores of said fly-wheel and said hub, additional damping elements each comprising two relatively movable parts one mounted in said hub and having two inclined walls confining a V-shaped hollow space, and the other part being secured to said fly-wheel and having a projection extending into said hollow space and spaced from said inclined walls to provide damping chambers filled with a liquid and throttling passages between said two parts leading from said damping chambers so that upon a relative movement between said fly-wheel and said hub liquid is displaced from said chambers through said throttling passages.

4. In combination with a rotating shaft, a hub carried thereby, a fly-wheel and resilient damping elements disposed in complementary bores of said fly-wheel and said hub, additional damping elements each comprising two relatively movable parts one mounted in said hub and having opposed inclined walls confining a V-shaped hollow space, and the other part being secured to said fly-wheel and having a projection extending into said hollow space and spaced from said inclined walls to provide damping chambers, said parts being further spaced to provide throttling passages between said two parts leading from said damping chambers, the said first part containing a duct for the supply of liquid to said damping chambers, said projection being formed with a flattened edge disposed opposite the mouth of said duct being slightly spaced therefrom.

5. The combination as specified in claim 3, in which the throttling passages are formed by the flattened ends of the said two inclined walls and the opposed correspondingly flattened portions of the said other part, including return passages communicating with said throttling passages.

GUSTAV PIELSTICK.